United States Patent [19]

Callahan

[11] 4,312,178

[45] Jan. 26, 1982

[54] LAWN EDGING MACHINE

[76] Inventor: Allie Callahan, 232 Jeff Davis Rd., Thomaston, Ga. 30286

[21] Appl. No.: 226,073

[22] Filed: Jan. 19, 1981

[51] Int. Cl.³ .......................................... A01D 53/14
[52] U.S. Cl. ........................................ 56/256; 172/15
[58] Field of Search ................................ 172/13–18; 56/256, 209, 208, DIG. 10; 46/106

[56]  References Cited

U.S. PATENT DOCUMENTS

| | | | |
|---|---|---|---|
| 531,535 | 12/1894 | Ingersoll | 56/209 |
| 750,506 | 1/1904 | Wells | 46/106 |
| 2,676,447 | 4/1954 | Asbury | 56/256 |
| 2,721,433 | 10/1955 | Berdan | 56/256 |
| 2,901,878 | 9/1959 | Johnson | 56/256 |
| 3,679,003 | 7/1972 | Wadsworth | 56/256 |
| 4,035,997 | 7/1977 | Duca et al. | 56/209 |

*Primary Examiner*—Robert A. Hafer
*Attorney, Agent, or Firm*—Newton, Hopkins & Ormsby

[57]  ABSTRACT

A balanced self-propelled and manually guided lawn edger is disclosed in which an edging cutter blade is positioned near the inner side and rearwardly of the larger of two traction wheels of unequal diameters on a common drive axle. The smaller traction wheel can be axially adjusted relative to the larger wheel to regulate the angle of cut adjacent to a side wall or curbing.

9 Claims, 6 Drawing Figures

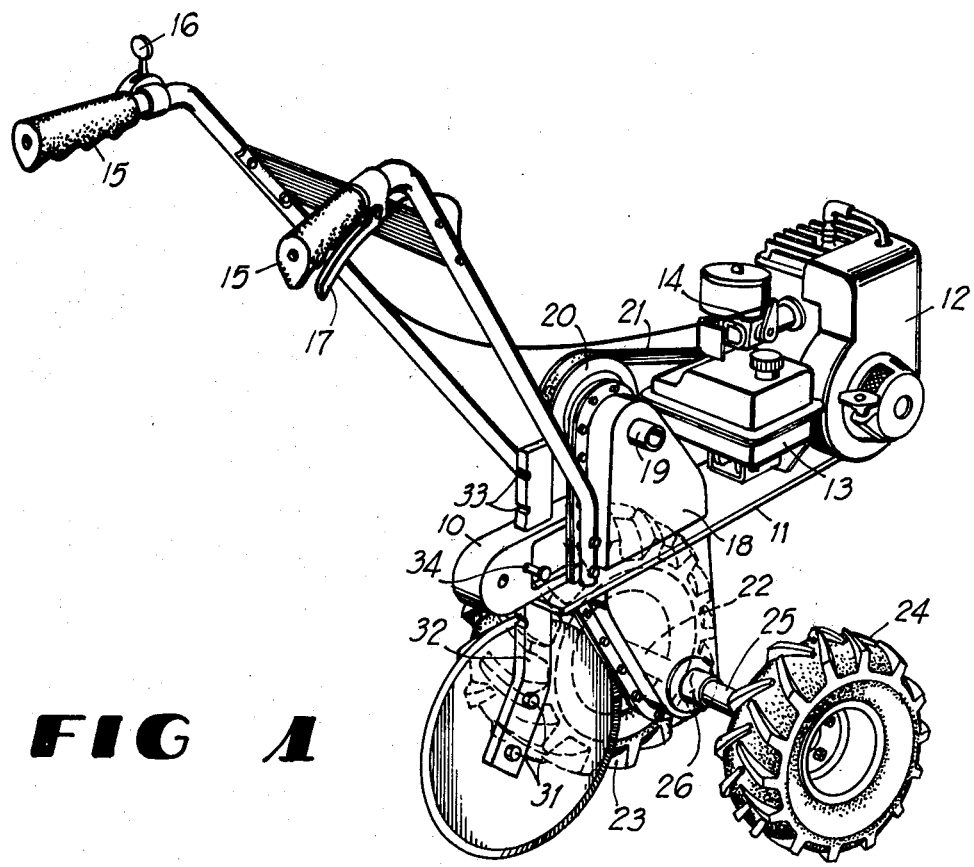

LAWN EDGING MACHINE

BACKGROUND OF THE DISCLOSURE

The objective of the invention is to provide an improved lawn edger of the self-propelled hand-guided type. Commonly such machines have three or four wheel carriages wherein the edging and trimming blade is held in a fixed location above the ground and cannot be raised and lowered or otherwise adjusted by mere manipulation of the machine guidance handles. Other known lawn edgers include tiller type rotary edging blades which are power driven. In general, such machines are rather complicated and quite costly.

In light of the deficiencies of the known prior art, the present invention seeks to provide a more efficient and less costly lawn edging machines of the self-propelled hand-guided type wherein the depth of cut of an angled edging blade may be regulated merely by tilting the machine guidance handles around the axis of two coaxial traction wheels which form the carriage of the machine.

In accordance with the invention, the two traction wheel are of unequal diameters to establish the cutting angle of an edging blade located near and inwardly of the larger traction wheel and somewhat behind the drive axis of the latter. The cutting angle of the blade can be varied conveniently by adjusting the smaller traction wheel axially toward and away from the larger wheel. The height of the edging blade can also be adjusted on the frame of the machine.

Other features and advantages of the invention will become apparent during the course of the following detailed description.

BRIEF DESCRIPTION OF THE DRAWINGS

FIG. 1 is a perspective view of a lawn edger according to the invention.

FIG. 2 is a fragmentary rear elevation of the lawn edger illustrating the use thereof.

DETAILED DESCRIPTION

Figure 3:
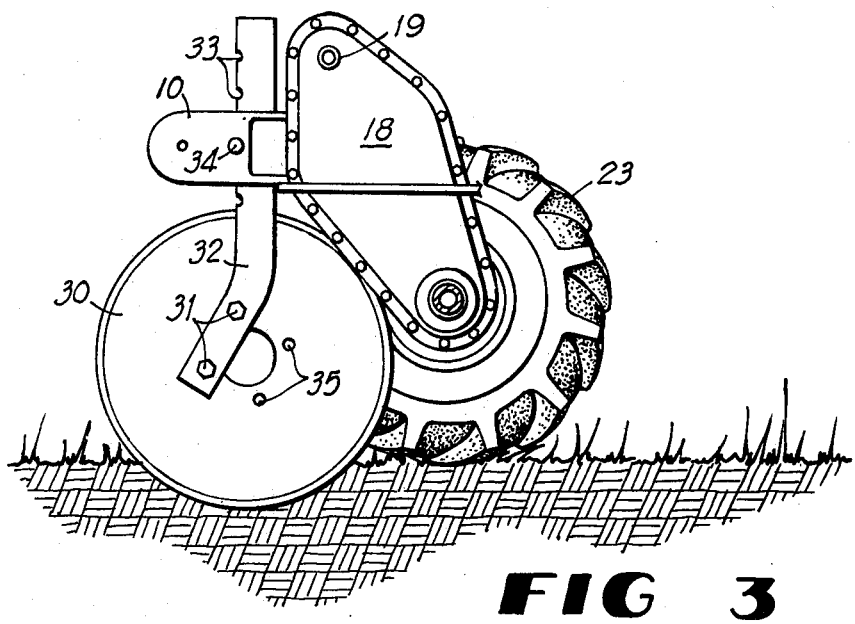
FIG. 3 is a fragmentary side elevation of the edger, partly in section.
Figure 4:
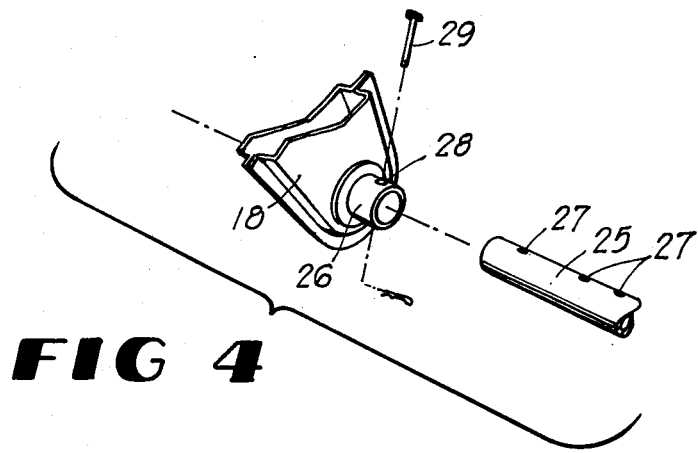
FIG. 4 is a fragmentary exploded perspective view of an adjustable wheel shaft mount.

Referring to the drawings in detail wherein like numerals designate like parts, a lawn edging machine in accordance with the invention includes a frame 10 having a platform portion 11 for the support of a conventional engine 12 having a fuel tank 13 and carburetor 14. Guiding handles 15 rise from the frame 10 and extend rearwardly thereof to enable a walking attendant to manipulate and guide the edging machine. One handle 15 includes a conventional speed control 16 while the other handle is equipped with a belt transmission engage and disengage lever 17.

A conventional belt transmission for the machine includes an upright housing 18 including an upper input shaft 19 journaled thereon and carrying an external input pulley 20, engaged with a transmission belt 21 connected between the pulley 20 and a drive pulley on the crank shaft of engine 12. A belt driven pulley, not shown, within the lower part of housing 18 is coupled to the transverse axle shaft 22 of a comparatively large traction wheel 23 to power the latter.

A smaller wheel 24 spaced laterally from the larger wheel 23 is rotatably held on a shaft section 25 which engages telescopically through a hub 26 secured to the lower part of transmission housing 18. The shaft section 25 has spaced adjusting holes 27 formed therein adapted to register selectively with a single aperture 28 of hub 26 whereby a locking pin 29 can be utilized to releasably lock the shaft section in any of several axially adjusted positions within the hub 26, in accordance with an important feature of the invention. During adjustment inwardly or outwardly relative to the hub 26, the shaft section 25 may also telescope with the driven shaft 22 of the larger traction wheel 23. The smaller wheel 24 is not a driven wheel and turns freely at any required speed on the shaft section 25.

An edging blade 30 preferably in the form of a disc is fixed by bolt means 31 to a rigid support arm 32 which depends from the frame 10 of the machine. The arm 32 is vertically adjustable through the selective cooperation of adjusting notches 33 in one edge thereof with a locking pin 34 held within an opening of frame 10 and adapted to enter a selected notch 33 to lock the arm 32 and blade 30 at the selected elevation relative to the frame 10 and ground wheels of the machine. Additional bolt openings 35 are provided in the disc blade 30 so that the blade can be turned and locked in several new positions on the arm 32 as wear gradually occurs in its cutting edge.

Figure 5:
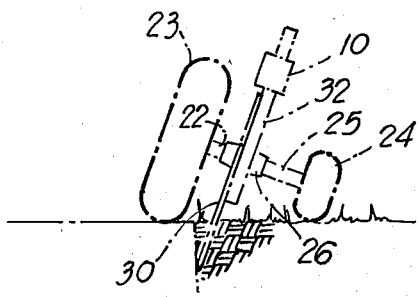
FIGS. 5 and 6 are diagrammatic rear elevational views depicting the angular adjustment of the edging blade through relocation of the smaller carriage wheel of the machine.
Figure 6:
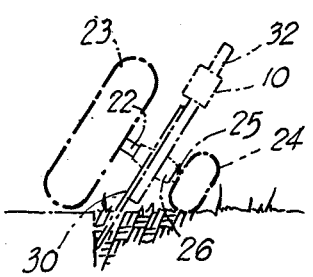

The blade 30 is thus positioned somewhat rearwardly of the axle shaft of the machine and near and inwardly of the larger driven wheel 23, at a fixed distance from this wheel. The distance of the smaller wheel 24 from the blade 30 and from the larger wheel 23 may be adjusted by use of the cooperating means 27, 28 and 29 to vary the angle of inclination of the blade 30 to the ground as depicted in FIGS. 5 and 6. As shown in FIG. 5, when the wheel 24 is extended from the larger wheel 23 and blade 30, the angle of the blade to the vertical is less than in FIG. 6 where the smaller wheel is adjusted to its closest position to the larger wheel and blade. This simple arrangement enables the user of the machine to vary the profile of the small trench formed by the blade 30 along one edge of a curbing, sidewalk or other pavement.

The edging machine is characterized by simplicity of construction, ease of adjustment, convenience of use, good balance, and it is also rugged and durable. It is a comparatively safe machine because rotation is not imparted to the blade 30 and the blade does not throw dirt or stones into the face of the user or others nearby.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An edging machine comprising a frame including guiding handle means for use by a walking attendant, an axle means supporting the frame, spaced ground wheels of unequal size on the axle means, the axle means including adjusting means whereby axial spacing of said wheels on the axle means may be varied, power drive means on the frame coupled with the axle means and driving the larger of said ground wheels in rotation, and an edging blade carried by said frame near and inwardly of said larger ground wheel and rearwardly of the axle means.

2. An edging machine as defined in claim 1, and said blade being held at substantially right angles to the axis of the axle means and being disposed between said ground wheels.

3. An edging machine as defined in claim 2, and cooperative means on said frame and blade to adjust the blade vertically relative to said frame and said ground wheels.

4. An edging machine as defined in claim 3, and said blade comprising a disc having a lower cutting edge portion projecting below ground level when said ground wheels are in rolling contact with the ground.

5. An edging machine as defined in claim 3, and said cooperative means comprising an arm rigid with said blade and carrying said blade and having spaced selectively operable detent means through which the elevation of the arm on said frame can be varied.

6. An edging machine as defined in claim 1, and said adjusting means including an axially adjustable shaft section on which the smaller of said ground wheels is freely rotatably mounted.

7. An edging machine comprising a frame having guiding handles for use by a walking attendant, an inclined axle means secured to and carrying said frame and having laterally spaced ground wheels of unequal diameters which establish the angle of inclination of the axle means when in rolling contact with the ground, an edging blade on said frame between said ground wheels and rearwardly of the axle means and being raised and lowered relative to the ground when said frame is rocked about the axis of said axle means, and means to adjust the lateral spacing of said ground wheels to vary the angle of the axle means and said edging blade, and power drive means on said frame for imparting rotation to the larger of said ground wheels.

8. An edging machine as defined in claim 7, and said edging blade being located near and axially inwardly of the larger of said ground wheels and being substantially normal to the axis of the axle means.

9. An edging machine as defined in claim 8, and said edging blade comprising a disc including means whereby plural edge portions of the disc may be held fixedly in cutting relationship to the ground to distribute wear around the cutting edge of the disc.

* * * * *